US006951225B2

(12) United States Patent
Kweon

(10) Patent No.: US 6,951,225 B2
(45) Date of Patent: Oct. 4, 2005

(54) SWITCHING VALVE FOR ION WATER GENERATOR

(75) Inventor: Soon Sun Kweon, Kyungki-Do (KR)

(73) Assignee: Dong Yang Science Co., Ltd., Kyungki-Do (KR)

( * ) Notice: Subject to any disclaimer, the term of this patent is extended or adjusted under 35 U.S.C. 154(b) by 0 days.

(21) Appl. No.: 10/113,906

(22) Filed: Mar. 29, 2002

(65) Prior Publication Data

US 2003/0145893 A1 Aug. 7, 2003

(30) Foreign Application Priority Data

Feb. 5, 2002 (KR) .......................................... 2002-6453

(51) Int. Cl.[7] .............................................. F16K 11/044

(52) U.S. Cl. .................................................... 137/625.5

(58) Field of Search .................. 137/625.5; 251/129.15, 251/129.21

(56) References Cited

U.S. PATENT DOCUMENTS 2,886,063 A * 5/1959 Ray ...................... 137/625.27
4,242,116 A * 12/1980 Aschberger et al. .......... 62/199
4,564,046 A * 1/1986 Lungu ................... 137/625.65
4,852,612 A * 8/1989 Bucko, Sr. ............... 137/625.5
5,184,773 A * 2/1993 Everingham ............. 137/625.5
5,443,241 A * 8/1995 Odaira et al. .......... 251/129.07
6,299,761 B1 10/2001 Wang .......................... 210/87
6,312,588 B1 11/2001 Conrad et al. ................ 210/85
6,319,414 B1 11/2001 Wiseburgh et al. ......... 210/739

* cited by examiner

*Primary Examiner*—John Fox
(74) *Attorney, Agent, or Firm*—Birch Stewart Kolasch & Birch LLP

(57) ABSTRACT

An ion water generator containing a switching valve for ion water generator that makes it possible to discharge the same species of ion water through a specific faucet despite the conversion of the polarity of chambers in the electrolyzers whenever the switching valve device includes a valve body with a double-headed drum pinched in at the middle for switching a pair of outflow openings to the discharging channels, and a solenoid housing for exerting a magnetic force on an iron core provided at the valve body.

5 Claims, 5 Drawing Sheets

SWITCHING VALVE FOR ION WATER GENERATOR

FIELD OF THE INVENTION

The present invention relates generally to an ion water generator, and more particularly, to a switching valve for an ion water generator. The present invention presents a switching valve provided with a solenoid that enables the outlet or the faucet to supply the same species of ion water, namely, either alkaline ion water or acid ion water, despite the polar conversion of the chambers comprising the electrolyzer of the ion water generator.

BACKGROUND OF THE INVENTION

It is well known that one of the causes for the modern adult disease like hypertension, diabetes, and heart disease is the acidification of the physical constitution of an individual due to the excessive intake of acid food.

As a consequence of the preference for alkaline ion water, an apparatus, i.e., an ion water generator has been introduced. It is understood that the use of alkaline ion water helps to convert acidic physical constitution into light-alkaline condition.

FIG. 1 is a schematic diagram illustrating the principle of the mechanism of an ion water generator in accordance with the prior art.

Traditionally, the ion water generator consists of a purifier 1 for the filtration of water and an electrolyzer 2 that electrolytically dissociates the purified water.

More specifically, the electrolyzer 2, comprising a cation chamber 4 and an anion chamber 5 being separated from each other by barrier ribs 3, produces ion water through an electrolysis process of water with proper voltages applied to these chambers.

When a voltage is applied at the cation chamber 4, oxygen gas is generated due to the reduction process of the hydroxyl ion in the electrolyzed water. During the reduction process, the negative acid ions, including chlorine, phosphorus, and sulfur, acidify the water in the cation chamber 4.

In the meanwhile, hydrogen gas is generated due to the reduction process of hydrogen in the anion chamber 5. Simultaneously, hydrogen ion pairs are produced by the positive ions, such as sodium, magnesium, and calcium.

Consequently, the solution of the anion chamber 5 becomes alkaline. The alkaline ion water produced at the anion chamber can be used for drinking water while the acid ion water can be used for skin care or sterilization.

Furthermore, the structure of the: alkaline ion water becomes hexagonal during the electrolysis, which turns out to be an outstanding feature for a sound body.

However, the prior art has a shortcoming in that the cations like calcium and magnesium are solidified at the negative electrodes of the cation chamber 5 during the electrolysis.

As time passes, the amount of the solidified tartar on scale at the negative electrodes becomes sufficiently large so as to cause a reduction of the electric current during electrolysis. The excessive build-up of scale at the negative electrode decreases the electrical current, thereby preventing the efficient dissociation of water during the electrolysis process.

The formation of the scale or tartar, on whatever, at the negative electrodes is unavoidable if the electrolyzer is used for quite a long period of time without switching the polarity between the anion and ration chambers.

Consequently, the state of the art in the field of ion water generation is such that the polarity of the voltage applied at the electrodes of each chamber is switched from time to time for preventing the formation of scale at the negative electrode.

In this approach, the role of each electrode is periodically commutated in an effort to effectively prevent the formation of scale at the electrode of the anion chamber. In other words, the cation and anion chambers are switched with each other periodically.

Since the roles of the cation chamber and the anion chamber are interchanged from time to time in accordance with the prior art, the species of the ion water, namely either alkaline ion water or acid ion water, discharged at the outlets or the faucets, should also be alternatively changing, accordingly.

However, it is natural that people expect to take the same kind of ion water, for example, alkaline ion water, from the faucet designating "drinking water". Thus, it would be undesirable and even more dangerous if the opposite species of ion water, for example, acid ion water is produced at the same faucet designating "drinking water" just because of the polar conversion taking place inside the apparatus.

If the same species of ion water needed to flow out of the same outlet continuously, the waterways from the chambers to the outlet must be re-configured in accordance with the commutation of applied voltage at the electrode of the chambers.

BRIEF SUMMARY OF THE INVENTION

In view of these problems, there is a need in the art to provide a device for alternating the configuration of the waterways in accordance with the polarity of the applied voltage at the electrodes.

Accordingly, it is an object of the present invention to provide a switching valve, which enables the outlet to discharge the same kind of ion water despite the polar conversion at the electrodes in the electrolyzer for preventing the formation of scale at the negative electrodes.

In accordance with a broad aspect of the present invention, there is provided a switching valve commutating the transfer routes of ion water in accordance with the polar switching of the applied voltage at the electrodes.

The present invention employs a solenoid valve for switching the transfer route for each type of ion water (i.e., alkaline ion water or acid ion water).

The present invention comprises a valve housing having an inlet connected to the channel of supply and a couple of outflow openings in the opposite directions wherein those outflow openings are interchangeably switched on and off in a complementary manner.

Each of the outflow openings is connected either to a discharging channel for alkaline ion water or to a discharging channel for acid ion water. Further, the species of ion water flowing through each discharging channel to the outlet, or the faucet, is fixed in accordance with the invention.

The species of ion water flowing through each channel of supply to the inlet of the valve housing is convertible in accordance with the polarity of the applied voltage at the electrodes.

Therefore, the waterway from the inlet to the outflow openings inside the valve housing must be re-configured in accordance with the polarity of the applied voltage at the electrodes.

Inside the valve housing, there is provided a valve body with a shape of a double-headed drum pinched in at the middle. In other words, the valve body comprises an upper part and a lower part wherein each part has the shape of a cylindrical disc. The upper and lower disc-shaped parts are connected together by a cylindrical shaft whose radius is smaller than that of the cylindrical discs.

The valve body moves up and down inside the valve housing in order to open or shut off either of the outflow openings. The upward movement of the valve body is propelled with the electromagnetic force exerted on the iron core integrated with the valve body.

The upward movement of the valve body causes the upper part of the valve body to shut off the outflow opening, for instance, to the discharging channel for alkaline ion water, while the lower part opens the outflow opening at the bottom.

When the disc-shaped upper part closes an outflow opening located at the upper side of the valve housing, the other disc-shaped lower part of the valve body opens the opposite outflow opening at the bottom of the valve housing, and vice versa.

Consequently, each of disc-shaped parts of the valve body alternatively switches the outflow openings to the discharging channels for alkaline ion water and acid ion water, respectively.

When the voltage applied to the solenoid housing is removed, the valve body moves downward and thereby converts the transfer route of waterways to the outflow opening at the top, namely, to the discharging channel for alkaline ion water.

As a result, it becomes possible to maintain the species of ion water consistently through a designated outlet/faucet even if the polarity of the ion water flowing in through the channel of supply has been changed over due to the polar switching of the chambers of the electrolyzer.

BRIEF DESCRIPTION OF THE DRAWINGS

Further features of the present invention will become apparent from a description of the present invention in conjunction with the accompanying drawings of the preferred embodiment of the invention, which, however, should not be taken to be limitative of the invention, but are for explanation and understanding only.

In the drawings.

DETAILED DESCRIPTION OF THE INVENTION

A detailed description of a preferred embodiment of the present invention will be explained in detail with reference to the accompanying drawings.

Figure 2:
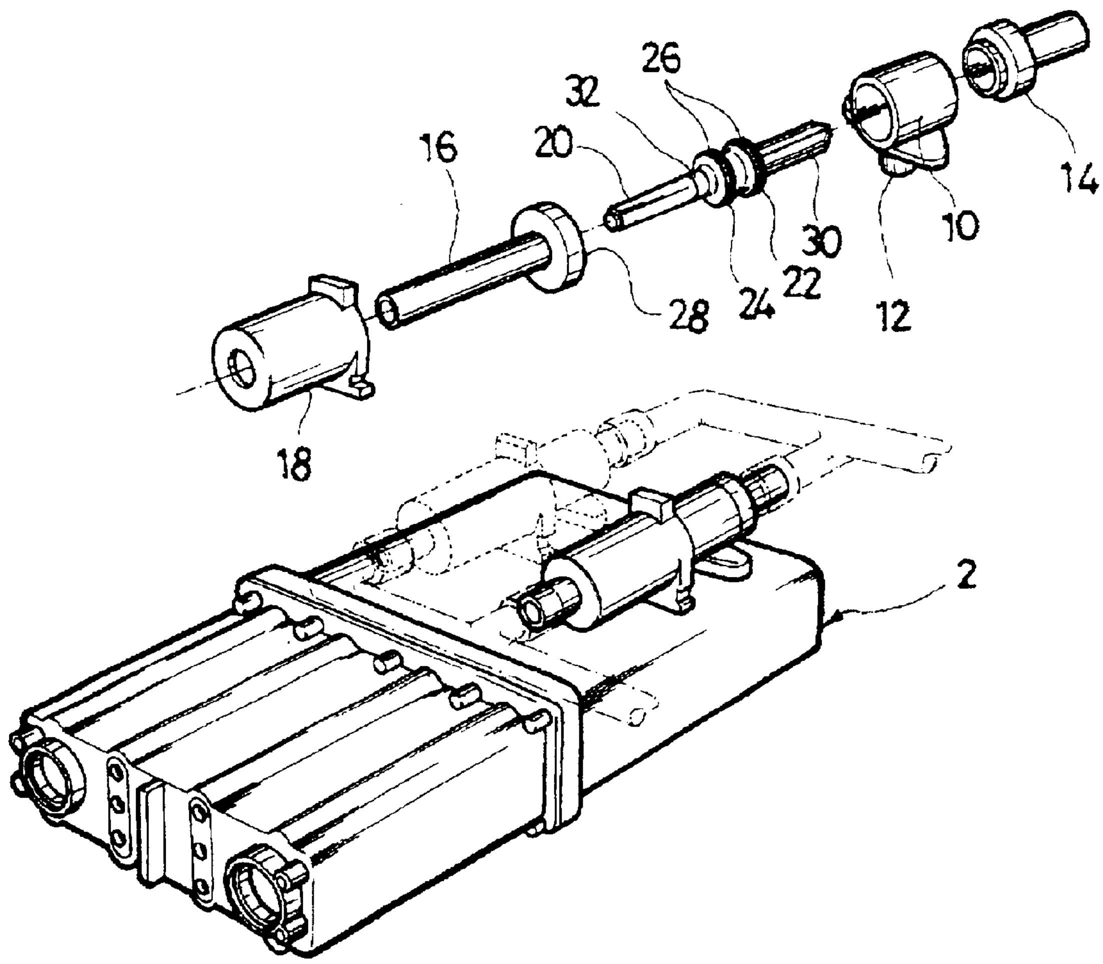
FIG. 2 is a schematic diagram illustrating the constitution of the switching valve in accordance with the present invention.

In FIG. 2 is shown a schematic diagram illustrating the constitution of the switching valve in accordance with the present invention.

Figure 1:
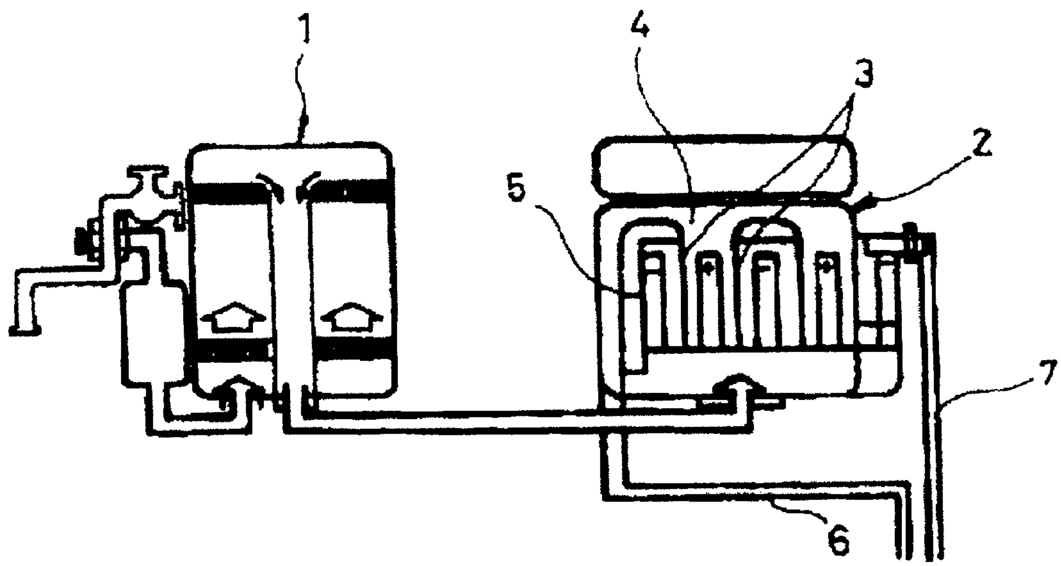
FIG. 1 is a schematic diagram illustrating an ion water generator in accordance with the prior art.
Figure 3:
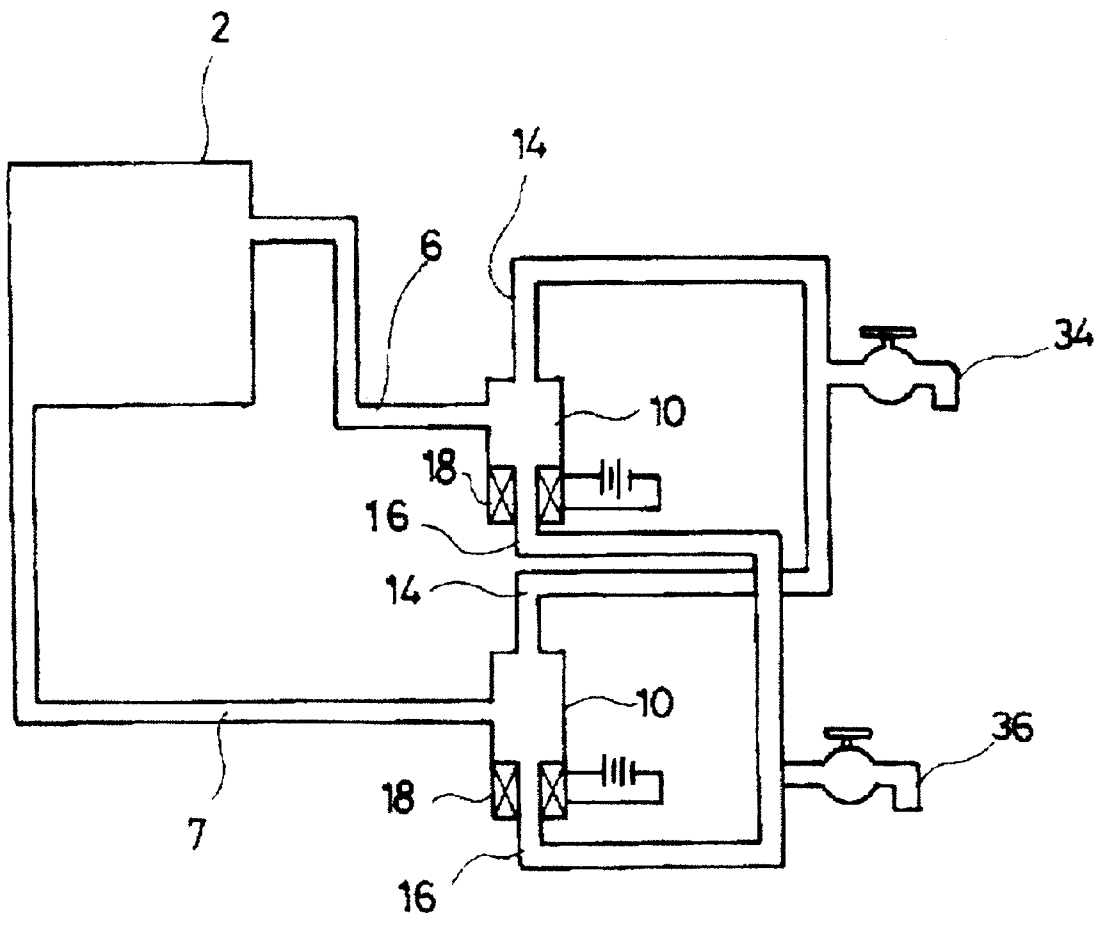
FIG. 3 is a schematic diagram illustrating the function of the ion water generator in accordance with the present invention.

Referring to FIGS. 1, 2 and 3, the electrolyzer comprises a cation chamber 4 and an anion chamber 5. The electrolyzer 2 further comprises a couple of valve housings 10 of circular, cylindrical shape.

A valve housing 10 has an inlet 12 that is connected to the channel of supply 6 or 7. At the top of the valve housing 10, there is provided an outflow opening connected to the discharging channel 14, for instance, for the alkaline ion water.

At the bottom of the valve housing 10, there is provided an outflow opening connected to the discharging channel 16, for instance, for the acid ion water in the opposite manner.

Preferably, the discharging channel 16 for the acid ion water passes through the solenoid housing 18.

An iron core 20 containing a lower spacer 32 is inserted in the orifice of the outflow opening toward the discharging channel 16. The iron core 20 moves up and down in a translational motion due to the electromagnetic force, in accordance with time sequence of the applied voltage at the solenoid housing 18.

Next to the lower spacer 32 there is provided the lower part 24 of the valve body 22, the lower part 24 having the shape of a cylindrical disc.

The valve body 22 comprises an upper part 23 and a lower part 24 and has the shape of a double-headed drum pinched in at the middle.

The valve body 22 has symmetry and therefore the upper part 23 also has the shape of a cylindrical disc.

The disc-shaped upper part 23 switches on and off the outflow opening toward the discharging channel for alkaline ion water, while the lower part 24 on and off the outflow opening toward the discharging channel for acid ion water.

At the top of the upper part 23, there is provided an upper spacer 30 that is inserted into the orifice of the outflow opening through to the discharging channel 14 for the alkaline ion water.

As a preferred embodiment of the present invention, for instance, rubber packing, 26 can be implemented for the prevention of leakage.

More preferably, the valve seat 28 can be prepared for tightly sealing the packing 26 to the outflow openings.

If one of the disc-shaped parts 23 or 24 shuts off either of the outflow openings of the valve housing 10, the other part 24 or 23 will open the corresponding outflow openings, due to the motion of the valve body 22.

The valve body 22 moves upward and downward when the voltage is applied at the solenoid housing 18 and electromagnetic force is exerted on the iron core 20.

Furthermore, the upper spacer 30 is installed such that it can be inserted into the orifice of the discharging channel 14 for guiding the motion of the upper part 23 when the valve body 22 is forced to move upward to block the outflow opening for alkaline ion water.

Consequently, a couple of solenoid valves 18 are installed for each channel of supply 6 and 7, respectively. Further, each solenoid valve 18 has a couple of discharging channels 14 and 16, one for alkaline ion water and the other for acid ion water.

Therefore, even when the species of the incoming ion water through the inlet 12 is switched from one to the other (i.e., alkaline to acid), the outflow openings inside the valve housing 10 are changed over correspondingly for reconfiguring the waterways to the faucet.

The present invention therefore comprises a couple of valve housings 10 connected to the channels of supply 6 and 7 and a, valve body 22 which opens and closes the outflow openings toward the dischaging channels. The present invention further comprises an iron core 20 moving the valve body 22 upward and downward; and a solenoid housing 18 exerting an electromagnetic force on the iron core 20.

Each valve housing 10 has an inlet 12, which is connected to each channel of supply 6 or 7. The species of the ion water entering the inlet 12 of the valve housing 10 is dependent on the polarity of the voltage applied at each electrode of the electrolyzer.

The waterways to the faucets/outlets 34 and 36 are discharging channels 14 for alkaline ion water and 16 for acid ion water, respectively.

Consequently, the selective switching on/off of the discharging channels is performed by the rise and fall of the valve body 22 with the iron core 20 under the control of the solenoid housing 18.

Preferably, the iron core 20 is installed into the orifice of the discharging channel 16 for acid ion water. This is because it is less probable that tartar or scale is present in the acid ion water and the acid water is usually used for sterilization rather than for drinking.

The iron core 20 in accordance with the present invention is extended due to the lower spacer 32 and is inserted into the outflow opening toward the discharging channel 16 for the acid ion water.

When the voltage is applied to the solenoid housing 18, the iron core 20 is elevated beneath the solenoid housing 18. As a consequence, the valve body 22 together with the iron core 20 moves upward to open the outflow opening at the bottom.

The valve body 22 in accordance with the present invention comprises a couple of disc-shaped parts, i.e., the upper part 23 and the lower parts 24. The distance between the upper part 23 and the lower part is adjusted in such a manner that if one of the disc-shaped parts shuts off an outflow opening then the other part opens the other outflow opening.

Preferably, a packing rubber 26 can be implemented on each of the upper part 23 and the lower part 24 for tightly sealing up the outflow opening.

More preferably, a valve seat can be prepared at the outflow opening in order to launch the valve body 22 with the packing 26 at the openings.

As a preferred embodiments, in accordance with the present invention, an upper spacer 30 is formed on the upper part 23 of the valve body 22. The upper spacer 30 is well designed such that the upper spacer 30 is still inside the orifice of the discharging channel 14 when the outflow opening is wide open due to the lowering of the valve body 22.

Furthermore, the upper spacer 30 guides the elevation of the valve body 22 such that the upper part 23 of the valve body 22 is safely received in the valve seat 28 for shutting off the outflow opening.

As a preferred embodiment of the present invention, the ascent of the iron core 20 is performed by the electromagnetic force of the solenoid while the descent of the iron core 20 is induced by the gravitational force of the iron core 20 and the valve body 22.

However, the mechanism for moving the iron core 20 does not have to be limited only to the above-mentioned embodiment.

Preferably, a spring can be implemented at the valve body 22 such that the urging force of the spring counteracts the gravitational force. As a consequence, it is possible to arrange the solenoid valve in a transverse manner as well as in a longitudinal manner.

Figure 4A:
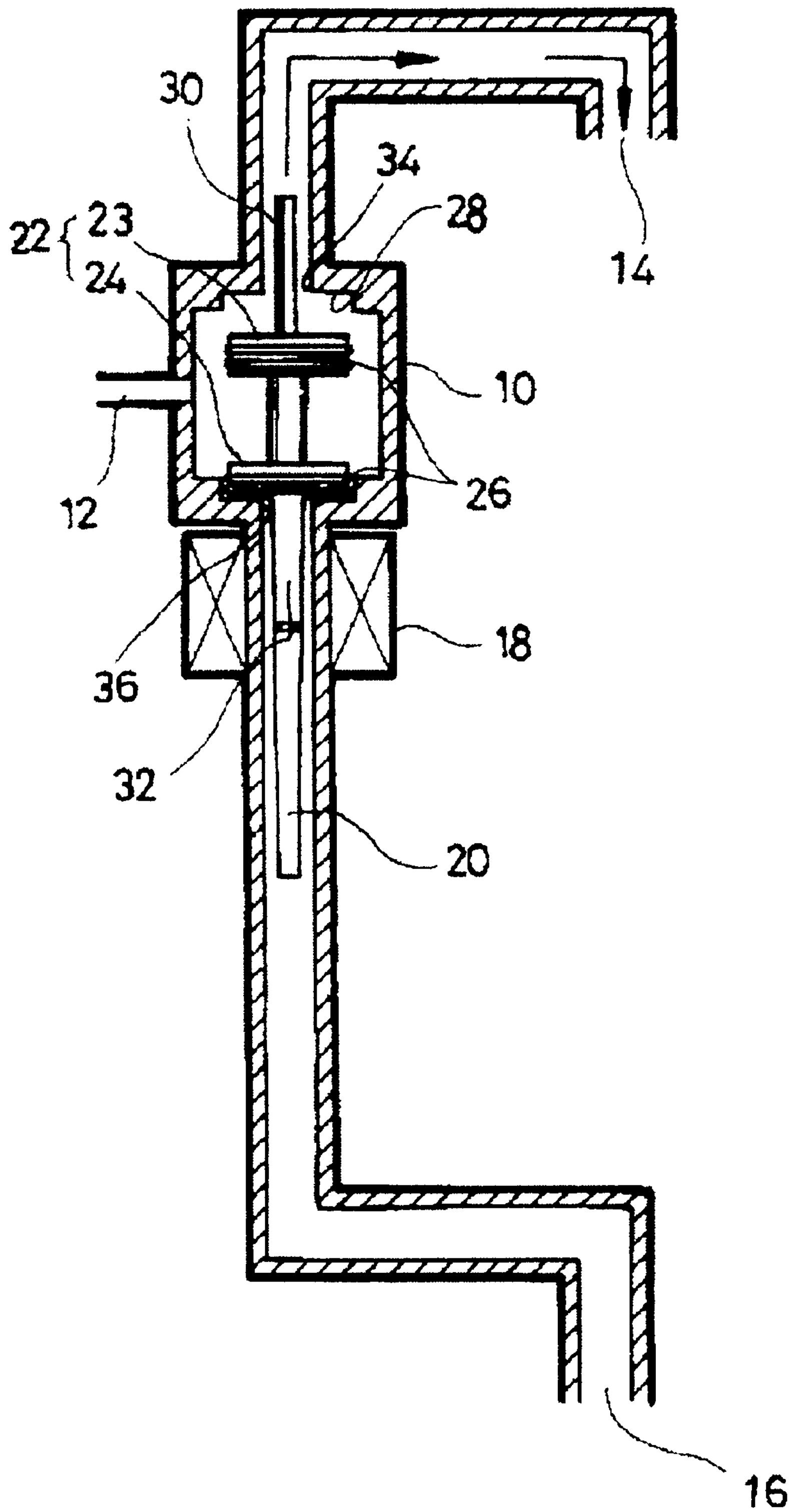
FIG. 4A is a schematic diagram illustrating the transfer route for alkaline ion water through the switching valve in accordance with the present invention.
Figure 4B:
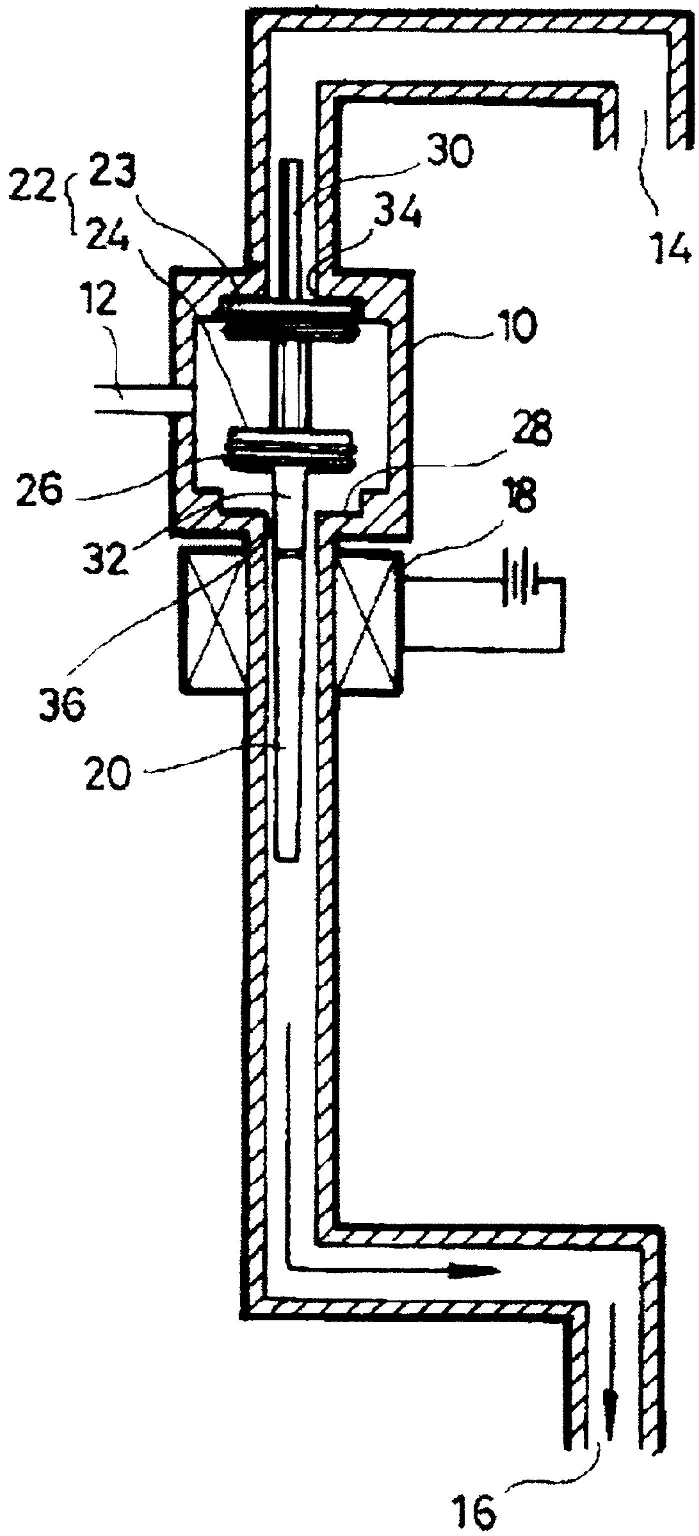
FIG. 4B is a schematic diagram illustrating the transfer route for acid ion water through the switching valve when the polarity of ion water has been changed over in accordance with the present invention.

FIGS. 4*a* and 4*b* are schematic diagrams illustrating transfer routes through the switching valve for alkaline ion water and for acid ion water, respectively.

Referring to FIGS. 4*a* and 4*b*, the discharging channel 14 is connected to an outlet 34, i.e. faucet, for alkaline ion water, while the discharging channel 16 is connected to the outlet 36 for acid ion water.

Referring to FIG. 4*a*, when the alkaline ion water is supplied through the inlet 12 to the valve housing 10, the outflow opening to the discharging channel 16 for the acid ion water is shut off because voltage is not applied to the solenoid housing 18

In this case, the alkaline ion water flows out through the discharging channel 14 since the lower part 24 of the valve body 22 shuts off the outflow opening at the bottom of the valve housing.

Now, when the polarity of the chambers has been reversed, voltage is applied to the solenoid housing 18. As a consequence, the iron core 20 moves upward due to the electromagnetic force.

Then the outflow opening to the alkaline discharging channel 14 is shut off and the incoming ion water is routed to the acid discharging channel 16 due to the elevation of the iron core 20.

Preferably, the switching valves in accordance with the present invention are installed for each channel of supply 6 and 7 in order to maintain the species of ion water through a specific faucet.

Although the invention has been illustrated and described with respect to exemplary embodiments thereof, it should be understood by those skilled in the art that various other changes, omissions and additions may be made therein and thereto, without departing from the spirit and scope of the present invention.

Therefore, the present invention should not be understood as limited to the specific embodiment set forth above but to include all possible embodiments which can be embodies within a scope encompassed and equivalents thereof with respect to the feature set forth in the appended claims.

What is claimed is:

1. A switching valve for separately producing alkaline ion water and acid ion water which comprises:

a valve housing provided with an inlet;

a supply channel for introducing ion water to said valve housing through said inlet, an alkaline ion water discharging channel and an acid ion water discharging channel extending from valve seats provided at opposite sides of the valve housing;

a valve body slidably disposed within the valve housing, said valve body being configured to selectively seal either one of the discharge channels by being fixed in one of said valve seats, while the other of said discharge channels remains open;

an iron core extending from the valve body into said acid ion water discharging channel, said iron core being movable in a translational manner with said valve body; and a solenoid operatively associated with said acid ion water discharge channel containing said iron core, wherein the opening and closing of the discharge channel is effected by a polarity change of the solenoid, whereby the voltage applied to the solenoid causes the solenoid to exert an electromagnetic force on the iron core which moves the valve body within the valve housing.

2. The switching valve of claim 1, wherein both discharge channels extend from opposite ends of the valve housing in substantial axial relationship with the slidable disposition of the valve body.

3. The switching valve of claim 1, wherein the ascent of the iron core and valve body is performed by the electromagnetic forces of the solenoid wherein the descent of the iron core and valve body is induced by the gravitational force of the iron core and valve body.

4. The switching valve of claim 1 wherein spacers extend from the valve body into the discharge channels.

5. A switching valve device for an ion water generator which comprises:

a valve housing having an inlet for introducing ion water from a channel of supply, an alkaline ion water discharging channel, and an acid ion water discharging channel located wherein said acid ion water discharging channel passes through a solenoid housing where the polarity of the applied voltage is routinely changed; and an iron core movable, in a translational manner, within said acid ion water discharging channel said iron core being formed as a united body with a lower spacer that extends from the lower part of a valve body, wherein said valve body has the shape of a double-headed drum with a disc-shaped upper part and a disc-shaped lower part, and wherein an upper spacer of the valve body is disposed inside the alkaline ion water discharging channel and the lower spacer as well as the iron core is inserted inside the acid ion water discharging line.

* * * * *